Inventor
William M. Barret

Inventor
William M. Barret

Patented Sept. 2, 1947

2,426,918

UNITED STATES PATENT OFFICE 2,426,918

METHOD FOR ELECTROMAGNETIC-WAVE INVESTIGATIONS OF EARTH FORMATIONS

William M. Barret, Shreveport, La., assignor to Engineering Research Corporation, Shreveport, La.

Application March 17, 1941, Serial No. 383,770

8 Claims. (Cl. 175—182)

This invention relates to the art of electrical prospecting. More particularly, the herein disclosed prospecting system provides apparatus and methods which employ electromagnetic waves in determining useful subsurface geologic information, and which furnish important data to guide the operation of all electromagnetic geophysical methods utilizing wave propagation.

One of the objects of the present invention is to furnish a useful technique for determining the depth of subsurface zones which reflect electromagnetic waves, and thereby map the configuration of said zones.

Another object of the invention is to provide a reliable means for determining the presence, depth and extent of underground masses which reflect electromagnetic waves.

Another object is to furnish a practical technique for locating and defining electrical discontinuities in buried strata, such as occur in a porous stratum at the boundary between salt water and petroleum, or when a reflecting zone "wedges out."

Another object is to provide an effective means for locating and defining the character of geologic faults.

An additional object is to make available a satisfactory means for locating and defining buried masses whose electrical characteristics differ sufficiently from those of the surrounding media, such as a buried salt dome, igneous plug or metalliferous vein.

An additional object is to furnish a technique for determining the optimum frequency to be employed in conducting electromagnetic-wave investigations.

An additional object is to provide a means for finding the frequency band or bands in the electric spectrum at which absorption of energy increases.

A further object is to make available apparatus and methods for determining other useful information for which the invention is adapted.

The present case is a continuation in part of applicant's earlier filed and now abandoned application, Serial No. 304,762, filed November 16, 1939, which discloses and claims specific forms of the invention disclosed and generically claimed herein. Applicant's copending divisional application Serial No. 584,675, filed March 24, 1945, discloses and claims suitable forms of apparatus that may be employed in carrying out the methods disclosed and claimed in the instant application.

The art and literature of electrical prospecting describe numerous geophysical methods which are postulated on the use of electromagnetic waves, and whose operations presuppose wave propagation in accordance with elementary optical principles. The earlier methods have been characterized almost invariably by two fundamental fallacies. One of these fallacies is the erroneous supposition that the attenuation suffered by an electromagnetic wave in traversing partially conducting media necessarily increases exponentially with the frequency of the wave. This misconception has arisen from the improper application of Maxwell's classical field equations. Based on Maxwell's equations, Haas ("Introduction to Theoretical Physics," vol. 1, p. 291, 1933, Constable and Co., London) derived the following expression for the attenuation of a plane wave traveling in a medium which has the properties of both a dielectric and a conductor.

$$E_x = E_0 e^{-\frac{2\pi k x}{\lambda}} \qquad (1)$$

where $E_0$ is the amplitude of the incident wave, $E_x$ is the amplitude of the wave after traveling the distance $x$ through the medium, $e$ is the base of natural logarithms, $\lambda$ is the wave length in free space, and $k$, the absorption factor, is given by:

$$k = \sqrt{\frac{\mu}{2}\left(\sqrt{\epsilon^2 + \frac{4\sigma^2}{\nu^2}} - \epsilon\right)} \qquad (2)$$

where $\mu$ is the magnetic permeability (approximately 1 for most sedimentary materials), $\epsilon$ is the dielectric constant, $\sigma$ is the specific conductivity and $\nu$ is the frequency of the waves.

Equation 1 predicts that the amplitude of the wave decreases exponentially as the wave length decreases, or conversely, as the frequency increases, and this interpretation has resulted in the customary use of low-frequency waves, on the presumption that the attenuation loss would be decreased and the effective working depth thereby increased. This assumes, however, that the absorption factor $k$ is independent of frequency, and from Equation 2 it necessarily follows that the dielectric constant and conductivity of the media have likewise been considered independent of frequency.

It is known that most dielectric materials are characterized by selective-frequency absorption, that is, their absorption of electromagnetic radiations varies with the frequency of the radiations. A familiar example of this effect is glass, which transmits visible light (electromagnetic radiations), but absorbs radiations in the ultra-violet and infra-red portions of the spectrum. Glass is thus transparent to a particular spectral band, but opaque to radiations of higher or lower frequency. It is even suggested by Lewis ("Physics," A. W. Duff, p. 632, 1937, The Blakiston Co., Philadelphia) that all substances would show selective absorption if the investigations were extended over a sufficient frequency range.

Many years of theoretical, laboratory and field have demonstrated conclusively that
ially conducting media comprising the
section likewise exhibit selective absorp-
d that for a given section there is an
a frequency at which the ratio of trans-
to absorbed radiations is a maximum.
s laboratory tests with geologic media
closed the presence of the characteristic
sion and absorption bands identified
terials exhibiting anomalous dispersion,
e brought out the notable fact that at
ir frequencies highly conducting media
v negligible loss angles, and consequently,
frequencies the media would cause no
ble attenuation of an electromagnetic liscovery brings to light a new phenom-
ich is directly opposed to conventional
ons, and alters completely the viewpoint
the possibilities offered by alternating-
geophysical methods. It means that by
er choice of frequency, geologic media
endered essentially transparent for elec-
etic waves. This does not imply that
1 or 2 is incorrect. The disagreement
 conventional belief that the attenuation
ily increases exponentially with fre-
arises from the general misconception
prevailed concerning the effective elec-
operties of geologic media when traversed
omagnetic waves of particular frequenxperiments further disclose the fact that
imum frequency for one geologic area
rom that of another, owing to changes
ur from place to place in the electrical
ristics of the stratigraphic section. And
r, in the same area, the optimum fre-
or one depth of investigation differs from
another. Accordingly, in prospecting by
of electromagnetic waves it becomes of
nce to determine the optimum frequency
particular area and depth of investiresent invention makes it readily possible
he optimum frequency for any given area
any workable depth of investigation. And
ily, it provides a useful means for deter-
the frequency or frequencies which cause
ease in the amount of electric energy
l.

stated previously that two fundamental
are evident in most of the earlier meth-
lzing electromagnetic-wave propagation.
-loss transmission of waves at particular
ies has been shown to overcome the ac-
notion that the attenuation necessarily
s exponentially with frequency, but it
to consider the second of these fallacies,
leals with the mode of wave travel as-
y the previous methods.
been the common practice, with those
predicated on wave reflection, to propa-
ves from a sending device to a buried
g mass, and to detect the reflected waves
eceiving device which is laterally disposed
pect to the sending device. The separa-
the earth's surface between the sending
iving devices has been by arbitrary known
s, and the wave path has been defined
aight line from the sending device to the
ng reflecting mass (where the angles of
e and reflection are equal), and thence
raight line to the receiving device. In
ords, the supposition has prevailed that
the wave propagation was represented by an in-
verted triangle having its apex at the reflector,
and the sender and receiver at the extremities
of its base on the ground surface. The definition
of the presumed triangular wave path has re-
quired, for the operation of the previous methods,
that the separation be known between the said
sending and receiving devices.

It is proposed in the present case to demon-
strate that the wave path described above, and
presupposed by many of the earlier electromag-
netic methods, is totally incorrect, and hence any
method which postulates this mode of wave travel
can not operate as claimed by its inventor. It
is further proposed to describe for the first time
the path followed by electromagnetic waves in
partially conducting media, and to show how
the reflection of the waves by strata having
anomalous indices of refraction can be utilized
to obtain much useful subsurface information.

Figure 6:
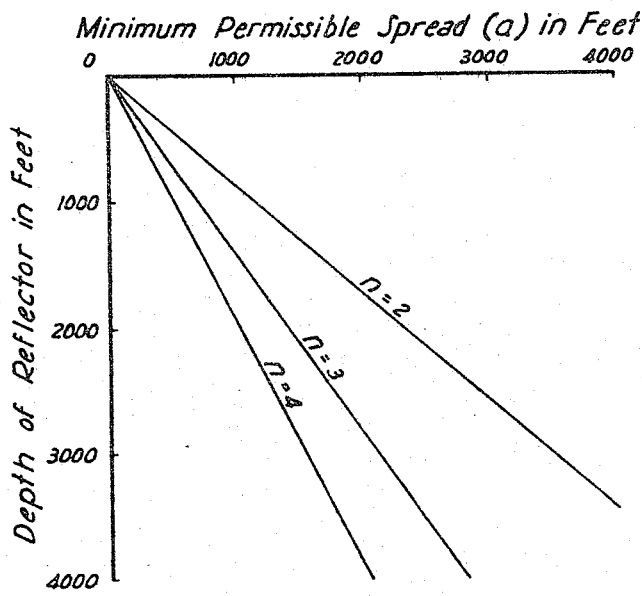

Fig. 6 presents a graphical representation of
the relation between the depth of a subsurface
reflector and the minimum permissible spread
that can be employed in mapping the said re-
flector, for three values of the refractive index.

Figure 7:
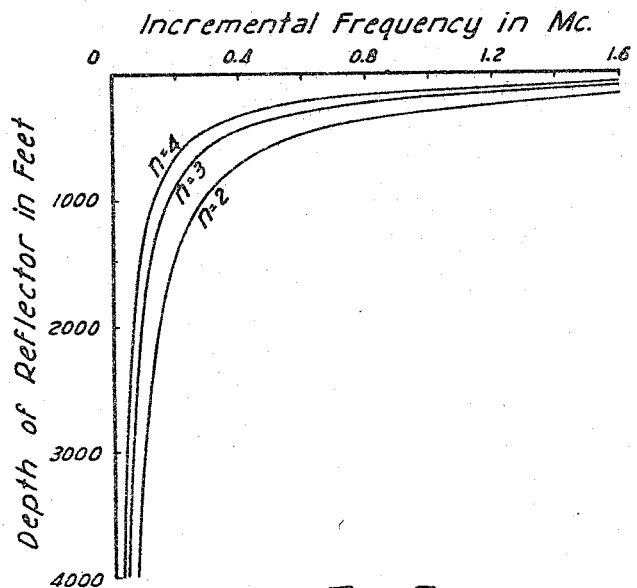

Fig. 7 displays graphs, for three values of the
refractive index, which illustrate the relation
between the depth of a subsurface reflector and
the observed incremental frequency.

Figure 8:
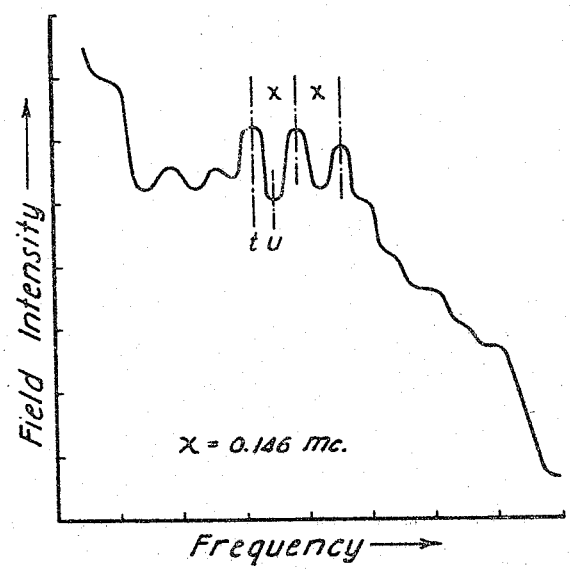

Fig. 8 illustrates a frequency-field intensity
curve that was obtained in an area where the
principal reflector lies at a depth of 1,440 feet.

Figure 9:
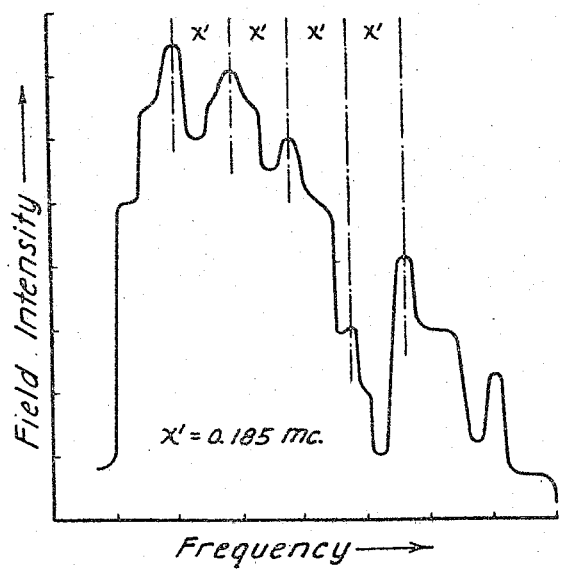

Fig. 9 shows a frequency-field intensity curve
secured in an area where the depth of the prin-
cipal reflector is 1,176 feet.

Figure 1:
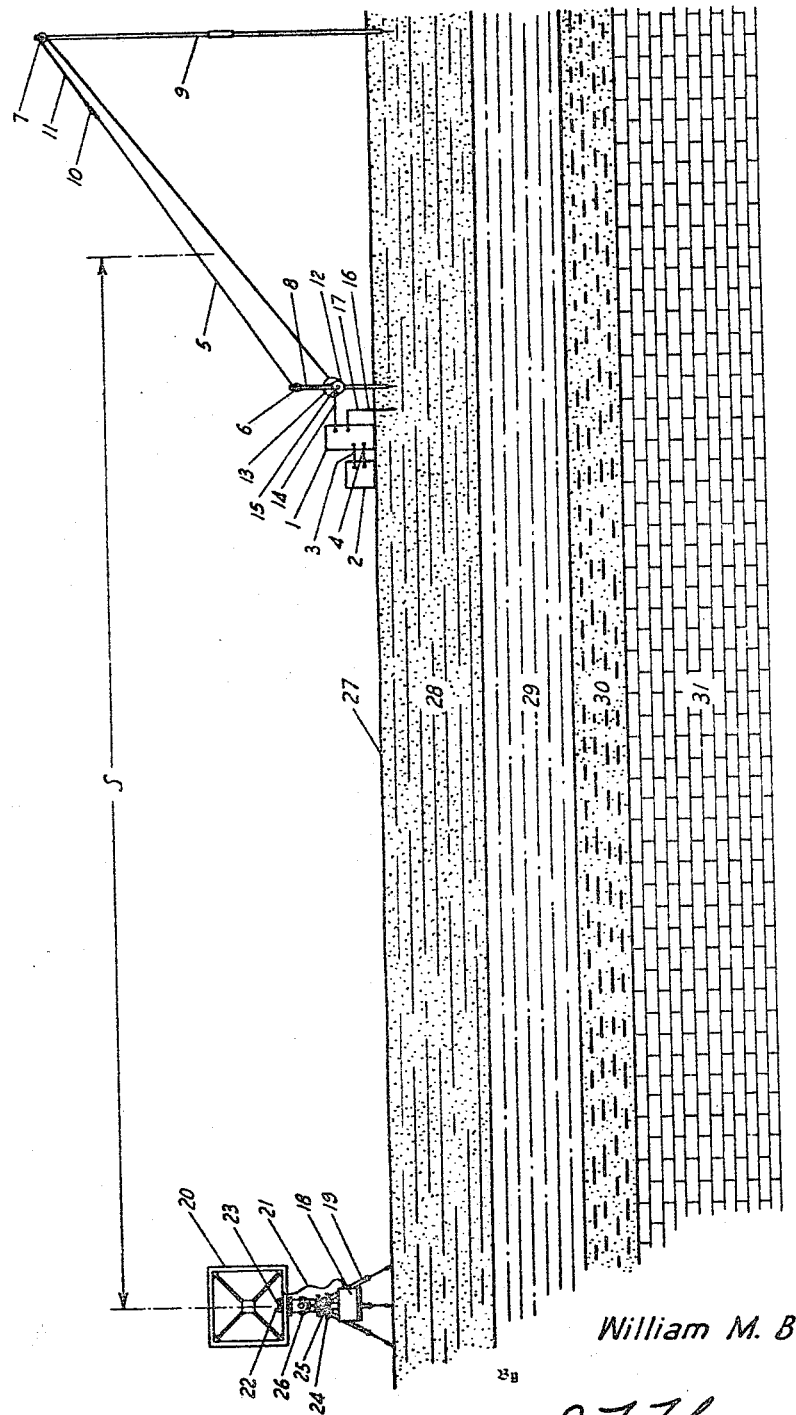
Fig. 1 shows in diagrammatic form the prin-
cipal electrical components embodied in this in-
vention, and a sectional view of a part of the
underlying earth.

Referring to Fig. 1 by numerals, I indicates
a generator of electromagnetic waves, termed
the exciter, 2 the power source for energizing
the said exciter, which may be a gasoline-driven
alternator having good voltage regulation, 3 and
4 the wires for transferring electrical energy from
the power source 2 to the exciter 1, 5 the pre-
ferred form of antenna, which is supported by
the pulleys 6 and 7 attached to the poles 8 and 9,
10 the insulator that connects the antenna 5 to
the rope 11, 12 and 13 the reels (each provided
with crank and ratchet) for controlling the length
and tension of the antenna 5 and rope 11 re-
spectively, 14 the wire connecting the said exciter
and the said antenna through the removable
contact 15 attached to the reel 12, 16 the metallic
rod for making intimate electrical contact with
the earth, and 17 the wire joining the "ground"
18 to the exciter 1. The receiver 19 is supported by the tripod 19, and energized by the loop 20, which may be turned about a horizontal and a vertical axis. 21 is the dual-conductor cable connecting the receiver 18 and loop 20. 22 is the bull's-eye level and 23 the compass for leveling and orienting the said loop, 24 the rotatable tripod head that supports the graduated horizontal scale 25 and graduated vertical scale 26, said scales providing means for finding the angles made by the plane of the loop 20 with horizontal and vertical reference planes. The surface of the earth is denoted by 27, and in descending order the formations 28, 29, 30 and 31 comprise the stratigraphic section illustrated, the said formation 30 representing a zone which reflects electromagnetic waves, such as a salt-water stratum.

Figure 2:
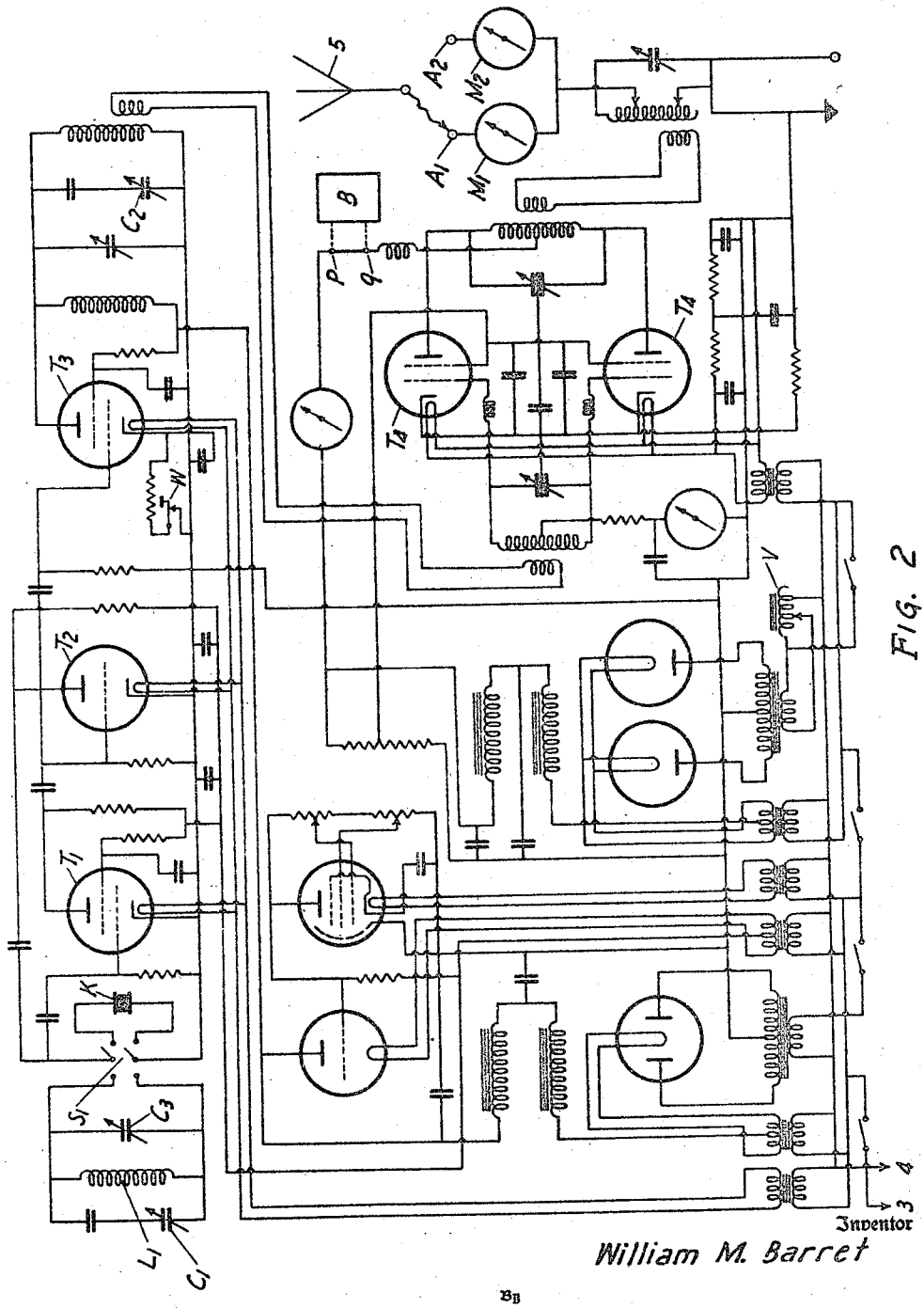
Fig. 2 is a circuit diagram of the preferred
form of exciter.

The exciter 1 employed with the herein described invention emits electromagnetic energy at a controlled power level, the frequency of the emission being continuously variable and accurately determinable throughout the working range. In Fig. 2 appears the circuit diagram of the preferred form of unmodulated exciter, which comprises a variable-frequency oscillator, a buffer amplifier, a final amplifier, an antenna-matching network, and a crystal-controlled oscillator for checking the frequency calibration of the variable-frequency oscillator.

The said exciter is energized by the external power source 2 (Fig. 1) through the wires 3 and 4.

When $L_1$ is placed in circuit by throwing the switch $S_1$ to the proper position, the tubes $T_1$, $T_2$ and their associated circuit elements become a Franklin oscillator whose frequency is controlled by the setting of the ganged condensers $C_1$ and $C_2$, and whose output is used to drive the buffer-amplifier tube $T_3$. A calibration curve, obtained with the aid of a heterodyne-frequency meter, shows the relation between the frequency of the Franklin oscillator and the dial setting of the condensers $C_1C_2$. When the switch $S_1$ is in the alternative position, the crystal K is in circuit and the tubes $T_1$ and $T_2$, with the circuit elements associated directly therewith, become a crystal-controlled oscillator, and the operating frequency of the exciter then is fixed by the said crystal. By using a monitoring receiver the crystal oscillator may be employed to standardize the frequency calibration of the Franklin oscillator, by means of the vernier condenser $C_3$, which compensates for any drift in frequency of the said oscillator. The power supply for the variable-frequency oscillator and the crystal oscillator is of a type that maintains its output voltage constant for normal variations of input voltage and load.

The final amplifier and its power supply is a conventional push-pull arrangement, deriving its input through the link circuit between the buffer-amplifier tube $T_3$ and the tubes $T_4$, which are coupled to the antenna 5 by a matching network. The said antenna may be connected to either terminal $A_1$ or $A_2$, so that the radiation meter, $M_1$ or $M_2$, having the most advantageous range can be used. The reading of the radiation meter may be maintained at the desired value by manipulating the continuously variable auto-transformer V, which controls the voltage impressed on the plates of the final-amplifier tubes $T_4$.

The key W provides a means for sending interrupted-constant-wave signals to the receiver 18 (Fig. 1), to facilitate field operations. Two-way communication between the units is completed through the use of an accessory transmitter at the said receiver, and a companion communication receiver at the exciter 1, each operating on a fixed frequency.

Figure 3:
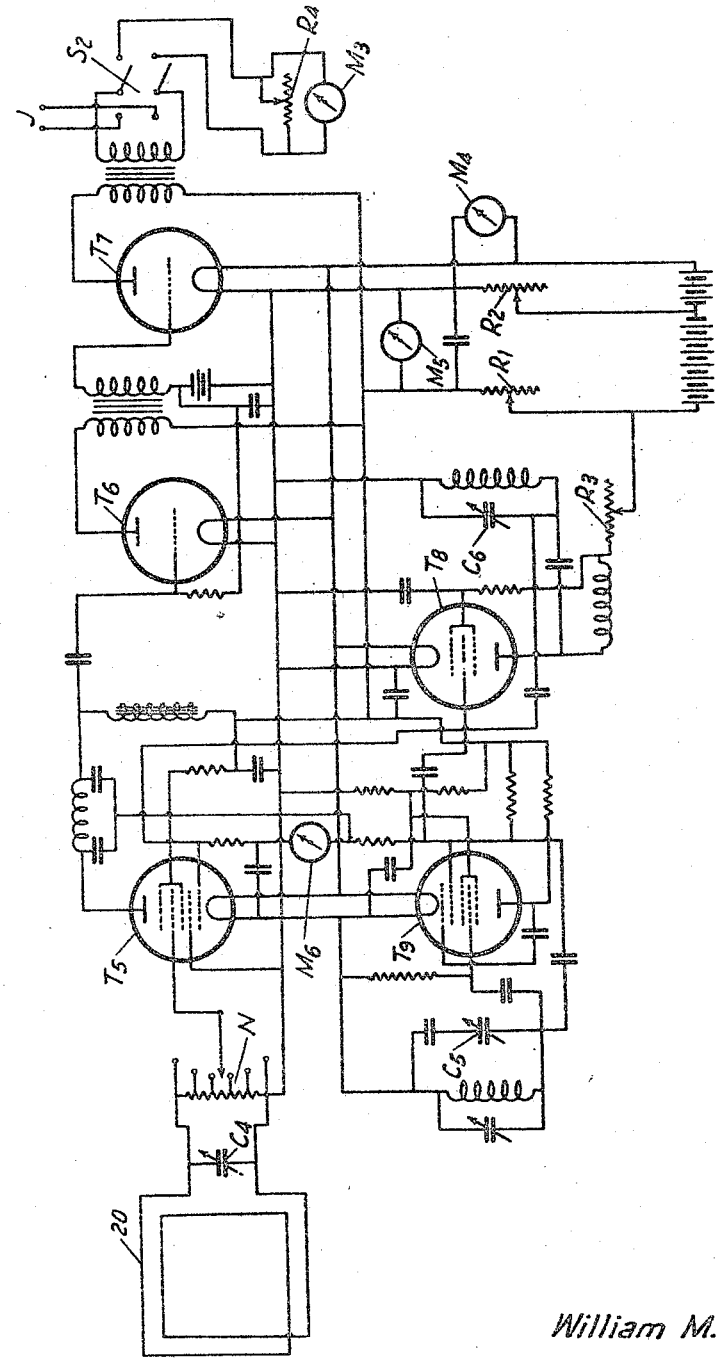
Fig. 3 is a circuit diagram of the preferred form
of receiver.

The receiver 18 used with this invention is self contained except for its loop antenna 20, and is light, rugged and readily portable. It may be designed to detect either modulated or unmodulated waves, but in the preferred form of operation unmodulated waves are used, and Fig. 3 shows the circuit diagram of the preferred form of receiver. It is of the heterodyne type, utilizing an audible beat note that first appears in the mixer tube $T_5$. The incoming signal is passed from the loop 20, which is tuned by the variable condenser $C_4$, through the calibrated attenuator N, which permits known fractional parts of the voltage appearing in the said loop to be impressed on the said mixer tube, thence to the sharply tuned audio amplifier, comprising tubes $T_6$, $T_7$ and their associated circuits, and finally into the output meter $M_3$, whose readings give the field intensity at the said loop when multiplied by the constant for the attenuator tap used. The output of the receiver can be diverted by means of the switch $S_2$ to the jack J, into which headphones may be plugged for telegraphic reception from the exciter unit; for checking the operation of the receiver, or for the purpose of determining if waves are being picked up by the said receiver from sources other than the said exciter.

When making an observation with the receiver the loop circuit is tuned by C, to resonate at the signal frequency, the filament, plate and injection voltages shown by meters $M_4$, $M_5$ and $M_6$, respectively, are adjusted to predetermined values by means of $R_1$, $R_2$ and $R_3$, the injection voltage being taken from the buffer-amplifier $T_8$, which is driven by the heterodyne oscillator $T_9$; the shunt $R_4$ is set to give the maximum reading of the output meter $M_3$, and the heterodyne oscillator is adjusted by the ganged condensers $C_5C_6$ to a frequency equal to the signal frequency plus (or minus) the resonant frequency of the said amplifier, this condition being indicated when the maximum reading of $M_3$ is obtained. The oscillator-amplifier combination illustrated enables a wide range of frequencies to be covered by simultaneously varying the ganged condensers $C_5C_6$, without the use of switches and with easily controlled output.

The description of preferred forms of the exciter and receiver embodied in this invention now is complete. These forms comprise an exciter whose unmodulated output may be varied over wide ranges of frequency and amplitude but which can be maintained within close tolerances when making an observation at fixed frequency, and a comparatively high-gain variable-frequency heterodyne-type receiver, whose amplification constant may be maintained at a precise level for any position of its calibrated input attenuator. The specification and drawings dealing with the exciter and receiver are to be regarded as illustrative and not restrictive, for it is obvious to those versed in the art that optional forms of exciters and receivers may be utilized to carry out the purpose of this invention.

Figure 4:
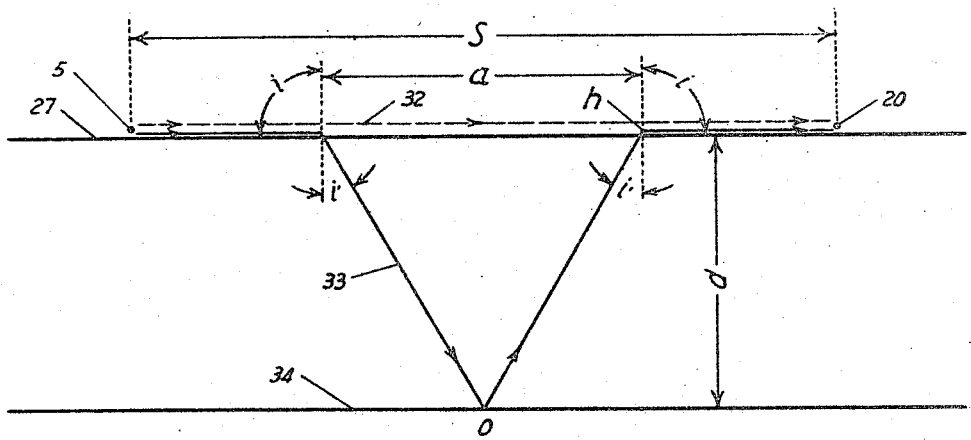
Fig. 4 shows the disposition of the exciter and
receiver when employed to determine the depth
of a single subsurface reflector, together with
the ray paths for the air and ground waves, and
the notations used in describing the operation of
the invention.

For example, an exciter and receiver using various types of modulated waves can be employed successfully in practicing this invention. The design and construction of oscillators and receivers for use with modulated waves are well known to those skilled in the radio art, but brief reference will be made here to the apparatus needed to utilize one of the most important forms of modulation, namely, amplitude modulation. The exreceiver already described can be easily
to make use of amplitude modulation.
se of the exciter, it is only necessary to
he link connecting points $p$ and $q$ (Fig.
insert conventional components (indi-
B) for modulating the plate voltage of
-amplifier tubes $T_4$. The receiver shown
can be readily modified by the simple
t of removing tubes $T_8$ and $T_9$ and then
ting the unit, though it is to be under-
t a more sensitive and selective receiver
sult from the addition of a tuned radio-
y amplifier ahead of tube $T_5$.
heory underlying the operation of the
escribed invention will be understood
discussion that follows.
ctice, the exciter 1 and receiver 18 are
the area to be examined (Fig. 1), and
d S made a sufficient amount to obtain
red working depth, it being understood
reasing spread corresponds to increas-
of investigation. When the exciter and
are energized, and the power level of the
djusted to a suitable value, waves will
gated from the exciter to the receiver,
lected parameter of the field associated
waves at the loop 20 may be measured
receiver 18. In the preferred form of op-
the receiver reading is obtained when
of the said loop is substantially vertical
cted toward the antenna 5. In this po-
e loop is energized by the component of
ric field lying in the vertical plane that
the receiver loop 20 and exciter antenna
component is commonly referred to as
intensity."
of the electrical energy reaching the re-
through the loop 20 is in the form of
es," which travel along and above the
etween the radiator 5 and the loop 20,
her part arrives in the form of "ground
which travel at considerable depths, de-
largely on the magnitude of the spread S.
er next the mechanism that controls the
veled by the ground waves. In Fig. 4 it
hat the air waves 32 are propagated di-
om the exciter antenna 5 to the receiver
but that the ground waves 33 arrive at
loop after being refracted downward
ground surface 27 to the reflecting sur-
which may be the top of the salt-water
30 (Fig. 1), where they are returned to
ce 27 and again refracted to the loop 20.
be understood that the angle of inci-
d of reflection are equal at the surface
hat the refraction at the ground surface
s the law governing "grazing incidence,"
he angles $i'$ of the refracted ray corre-
the "critical angle."
ondition for the optimum detection of
cted ray is that the length of the earth
all be a minimum, to reduce as far as
the absorption, and that there shall be
or $(m+\frac{1}{2})$ more waves along the path
n in path $a$, $m$ being an integer.
azing incidence Snell's law becomes:

$$n = \frac{\sin i}{\sin i'} = \frac{1}{\sin i'}$$

the index of refraction of the medium
g the reflecting surface 34. Also $$n = \frac{\lambda_a}{\lambda_g}$$

where $\lambda_a$ is the wave length in air and $\lambda_g$ is the wave length in the ground. Then $$\frac{a}{\lambda_a}$$

is the number of waves in the air path $a$ and $$\frac{2d}{\lambda_g \cos i'} = \frac{2nd}{\lambda_a \cos i'}$$

is the number of waves in the earth path via $o$. Consequently we may write $$\frac{2nd}{\lambda_a \cos i'} - \frac{a}{\lambda_a} = m + \frac{1}{2}$$

but $a = 2d \tan i'$, so that $$m + \frac{1}{2} = \frac{2d}{\lambda_a}\left(\frac{n}{\cos i'} - \tan i'\right)$$

Since $$\sin i' = \frac{1}{n}, \cos i' = \sqrt{1 - \frac{1}{n^2}} = \frac{1}{n}\sqrt{n^2 - 1},$$

$$\tan i' = \frac{1}{\sqrt{n^2 - 1}}, \text{ and } \lambda_a = \frac{c}{s}$$

where $c$ is the velocity of an electromagnetic wave in free space and $s$ is the frequency of the wave in cycles per second, we have $$m + \frac{1}{2} = \frac{2sd}{c}\left(\frac{n^2}{\sqrt{n^2-1}} - \frac{1}{\sqrt{n^2-1}}\right)$$

$$= \frac{2sd}{c}\sqrt{n^2 - 1}$$

Assigning $c$ its numerical value of $9.84 \times 10^8$ feet per second, and letting $D$ be the depth of the reflector in thousands of feet and $f$ be the frequency in megacycles ($10^6$ cycles per second), we can write $$m + \frac{1}{2} = \frac{2\sqrt{n^2 - 1}(D \times 1000)(f \times 10^6)}{9.84 \times 10^8}$$

$$= 2.034 Df\sqrt{n^2 - 1} \qquad (3)$$

The path of but a single ground ray has been considered in the foregoing derivation and in the diagram of Fig. 4, but it is to be understood that the rays continue to "peel off" and enter the earth at grazing incidence as the air wave advances from the radiator 5 toward the receiver loop 20, and similarly, at the distance $a$ from their point of penetration, the rays continue to emerge from the earth at the critical angle, and are refracted along the earth's surface and concentrated as a bundle of rays at the said receiver loop. For a given frequency, all of the emergent ground rays have the same phase at any particular point along the earth's surface, and also at any point on the said surface to the right of $h$ (Fig. 4) the relative phase of the air rays and the ground rays will be the same. This action leads to a distinct reinforcement of the waves that reach the said loop.

It will be noticed that the separation, or spread S, between the exciter and receiver does not appear in Equation 3. It is to be recognized, however, that the spread must be sufficient to permit detection of the refracted ray, and that it should be kept reasonably low to minimize attenuation.

Referring again to Fig. 1, if the frequency of the waves generated by the exciter 1 be varied in successive steps, and field-intensity measurements obtained at each step with the receiver 18, then a graph can be plotted which displays the relation between frequency and field intensity for the particular setup. Interference maxima and minima will appear on the frequency-field intensity curve when the path of the refracted ray and the path of the air ray differ in length by the proper amount to give constructive or destructive interference, respectively. Ignoring phase changes that may occur at the reflector, the incremental frequency (frequency difference between successive maxima or minima) needed to cause destructive interference (minima) can be found by subtracting Equation 3 from Equation 4 below:

$$2.034 D f_2 \sqrt{n^2-1} = m + 1\tfrac{1}{2} \quad (4)$$

$$2.034 D f_1 \sqrt{n^2-1} = m + \tfrac{1}{2} \quad (5)$$

which results in $$2.034 D (f_2-f_1) \sqrt{n^2-1} = 1$$

or $$d = \frac{492}{(f_2-f_1)\sqrt{n^2-1}} \quad (5)$$

when the depth $d$ is expressed in feet, the incremental frequency $(f_2-f_1)$ in megacycles, and $n$ is the index of refraction of the geologic material overlying the reflector.

It is important to note from Equation 5 that no account need be taken of the spread S (Fig. 4), provided it is sufficient to give the required working depth, as the angle of penetration and emergence of the waves is determined by the index of refraction of the medium investigated, and not by the geometry of the system, as in the case of seismic reflections, and as previously assumed for many of the electromagnetic methods. Neither the literature nor the art of electrical prospecting has ever utilized the wave paths postulated in developing Equation 5 as applicant has done, and the important fact that the spread between the exciter and receiver need not be known for the operation of the present invention provides a distinguishing characteristic and a fundamental difference between the said invention and the earlier techniques utilizing electromagnetic-wave propagation.

The derivation of Equation 5 is based on some simplifying assumptions. The earth's surface 27 and the underground reflector 34 are considered plane parallel surfaces; the velocity of the air wave near the ground is taken the same as in free space (wave-length measurements indicate that this assumption is permissible), and the refractive index is considered independent of frequency.

When the reflector makes an angle $\theta$ with the earth's surface, its depth is given by:

$$d = \frac{984(\sqrt{n^2-1} \cos 2\theta + \sin 2\theta)}{(f_2-f_1)[n^2(\cos 2\theta+1) - 2\cos 2\theta + 2\sqrt{n^2-1}\sin 2\theta]} \quad (6)$$

where $\theta$ is positive if the slope of the reflector is downward from the receiver to the exciter, and negative (or $\pi-\theta$) if the slope is downward to the receiver. In deriving Equation 6, which reduces to Equation 5 when $\theta$ is zero, it was assumed for simplicity that the line joining the exciter and receiver is perpendicular to the strike of the reflector. In the more general case, where the line joining the exciter and receiver is oblique to the strike of the reflector, three dimensions must be considered because the entire ray path from the exciter to the receiver is not contained in one plane. The general case will not be treated here.

Figure 5:
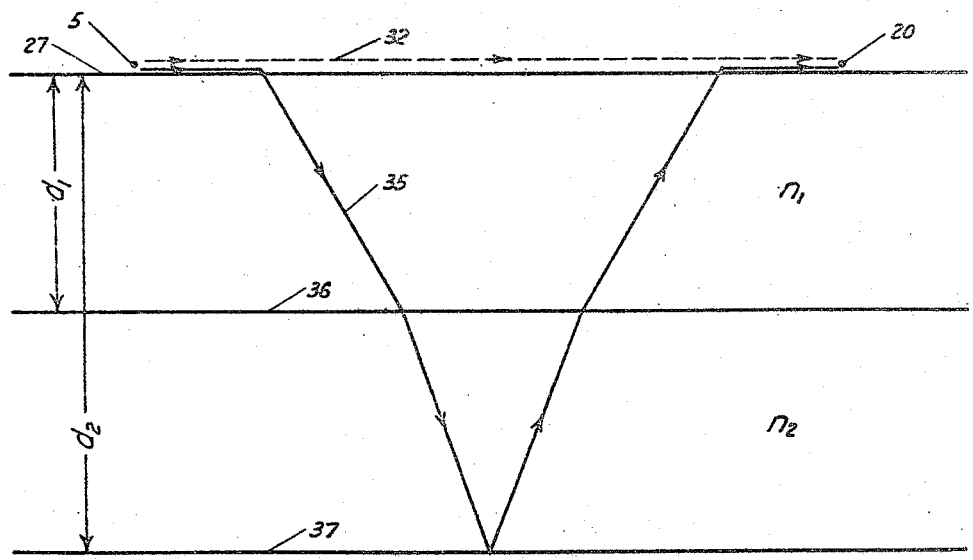
Fig. 5 illustrates the arrangement of the exciter
and receiver when used to find the depth of the
lower of two subsurface reflectors, together with
the ray paths for the air and ground waves, and
the notations used in describing the operation of
the invention.

In Fig. 5 appears a diagram illustrating the path followed by the ground wave 35 in traversing two earth layers having refracting indices $n_1$ and $n_2$, when $n_2 > n_1$. If the reflecting surfaces are denoted by 36 and 37, then the depth of the lower reflector may be obtained from the following expression:

$$d_2 = d_1 + \frac{492}{\sqrt{n_2^2-1}}\left[\frac{1}{f_2-f_1} - \frac{1}{f_4-f_3}\right] \quad (7)$$

where $(f_4-f_3)$ is the incremental frequency corresponding to the lower reflector. And for any number of reflectors $r$, the depth of the $r$th reflector will be:

$$d_r = d_{r-1} + \frac{492}{\sqrt{n_r^2-1}}\left[\frac{1}{f_{2r}-f_{2r-1}} - \frac{1}{f_{2r-2}-f_{2r-3}}\right] \quad (8)$$

The solution of the problem involving multiple reflectors, having various dips, seems unwarranted here.

For the simple case of a plane reflector parallel to the earth's surface (Fig. 4), the ground waves enter and emerge from the earth at grazing incidence, and after progressive reinforcement finally arrive at the receiver loop 20. It is to be understood, however, that the reinforcing action of the reflected rays does not occur when the dip of the reflector is positive, since only the reflected rays that emerge at the receiver loop will be detected. When $\theta$ has an appreciable negative value, the reflected rays can not emerge at the ground surface 27 because they are incident on the surface at an angle greater than the critical angle, and hence are totally reflected downward and therefore do not reach the receiver loop. In case a negative dip of the reflector is suspected, because of the absence of reflections, it is easily possible to check the condition by transposing the exciter and receiver.

In developing the theory underlying the operation of the herein described invention, the preceding discussion has been predicated on the assumption that the electromagnetic waves propagated by the exciter antenna are incident on the earth's surface at an angle of 90 degrees. It is by no means to be inferred, however, that the invention will not function unless the waves are incident on the said surface at an angle of 90 degrees, for it is known that various angles of incidence can be used successfully in practicing the invention. In fact, angles other than 90 degrees are preferable in some instances, for example, in certain cases involving dipping reflectors. The operation of the invention for various angles of incidence is susceptible to the same kind of mathematical treatment as already outlined for the condition of 90-degree (grazing) incidence, though in general, grazing incidence leads to simpler solutions. This will be seen by comparing Equation 5, which was derived for grazing incidence, with the equation given below for various angles of incidence $i$, other conditions remaining the same:

$$d = \frac{492\sqrt{n^2-\sin^2 i}}{(f_2-f_1)(n^2-\sin i)}$$

The preferred apparatus and methods are based on grazing incidence largely because of the resulting simplification in the exciter radiating system, and the reinforcement of the waves that generally occurs at the receiver loop when the propagated waves peel off and enter the earth at grazing incidence. In short, the preferred means and methods are simpler to apply in practice, are more convenient to use, and in general are more effective.

ration of the present invention can be mathematically for any angle of inci- he waves impinging on the earth's sur- :omplex arrangements of earth layers ting surfaces, and for variations of the indices with depth and angle of inci- the waves employed, but the cases al- cribed are considered sufficient to ex- fundamental theory underlying the op- the invention, to demonstrate its ap- to particular subsurface problems, and its scope of usefulness.

referred briefly to the operating prin- ie invention, it remains now to consider ition to achieve the objects already enur first the application of the invention ine the depth of a subsurface zone (or lich reflects electromagnetic waves, for a salt-water stratum. For simplicity in ing discussion we shall assume that both id surface and the underlying reflector parallel surfaces. The apparatus is set icated in Fig. 1, with the midpoint be- e exciter antenna 5 and the receiver i the immediate vicinity of the point on id surface 27 at which the depth deter- is to be made. Knowing the maximum be explored, the minimum permissible (Fig. 4) may be found from Fig. 6, which e relation between $a$ and $d$ for three the refractive index. As stated previ- e spread is not critical and its value be known. The only limitation for the that it be a sufficient amount to per- ction of the ground waves returned to ver by the buried reflector, and that it enough to minimize the attenuation of nd ground waves.

the apparatus is positioned, the exciter gized and its power level adjusted and ed at a suitable and constant value by f the variable auto-transformer V and g current meter $M_1$ or $M_2$ (Fig. 2). The y of the electromagnetic waves propa- the antenna 5 then is varied in succes- s through the required frequency range, ich step a selected parameter of the field d with the waves at the loop 20 is meas- h the receiver 18, and recorded. It is od that the frequency increment to be d the frequency range to be explored, mined by the depth of the reflector, it sirable to decrease the frequency incre- d range as the depth of the reflector in- and vice versa. Significant information d by measuring one or more of several ameters at the said loop as the frequency adiations is varied, but as pointed out ly, in the preferred form of operation d intensity" is measured by the said renbering that it is the purpose of the se- bservations to determine the depth of a ce reflector by means of interference phe- on the frequency-receiver reading curve, refore evident that no maximum and/or n should appear on the curve that is due imental characteristics. The exciter and described previously are free of such ef- it great care must be exercised in the nd operation of the exciter radiating sys- completely avoid undesirable frequency iristics. And moreover, to display with finition the recurrent maxima and minima associated with a particular underground reflec- tor, it frequently is desirable that there be no progressive increase or decrease in the intensity of the air waves at the receiver loop as the fre- quency of the propagated waves is varied through the working range, for a steep slope of the fre- quency-receiver reading curve tends to obscure the "reflections" caused by the said reflector.

The solution of this problem can be approached in numerous ways, each of which finally results in an engineering compromise that is dictated by the required mobility of the apparatus. There follows a description of the preferred radiator and mode of operation for maintaining substan- tially constant the field intensity due to the air waves at the said receiver loop. The mechanism and operating technique to be described result in a substantially constant radiation pattern, or field pattern, about the exciter antenna as the frequency of the propagated waves is varied.

The preferred radiating system consists of the single-wire sloping antenna 5 illustrated in Fig. 1, which is grounded by the metallic rod 16. To prevent undesirable frequency characteristics, it is preferable that substantially the same cur- rent distribution be maintained in the antenna for each frequency required in practice. This is accomplished by making the length of the said antenna, from the insulator 10 to the ground con- nection 16, approximately equal to one-quarter wave for each frequency used, which requires that the antenna length be reduced as the frequency is increased. The length of the antenna can be adjusted readily by means of the wire reel 12 and rope reel 13, each of which is provided with a crank and ratchet for maintaining the said an- tenna at the proper tension for all frequency set- tings. In determining the antenna length cor- responding to a particular frequency, it is only necessary to find the length (approximating one- quarter wave) that results in maximum radiation current, for a given input to the exciter, when the reactance of the antenna coupling unit is sub- stantially zero. When the proper antenna lengths have been found experimentally for the respec- tive frequencies to be employed in practicing the invention, the antenna is marked for each fre- quency, so that the correct length for any desired frequency can be obtained quickly and conven- iently.

The antenna lengths arrived at in one area will differ sometimes from those found in another area, owing to changes that take place in the electrical properties of the ground material, but experience shows that the order of difference is comparatively small and that satisfactory op- eration is secured with a fixed schedule of an- tenna lengths for all ordinary areas.

The foregoing description has dealt with the preferred form of "grounded" antenna, but it should be stated here that the wire 17 can be connected to a suitable counterpoise instead of the ground rod 16, and that the procedure out- lined for finding the proper antenna lengths will apply equally well in either case.

It should be brought out at this point that when the measurements require frequencies so low that it is impracticable to use an antenna having a physical length approximating one-quarter wave, then by utilizing a "top loaded" antenna it is possible to maintain essentially constant cur- rent distribution in the radiating system by so varying the antenna length and the loading in- ductance that the electrical length of the antenna is kept substantially one-quarter wave for each frequency employed.

It is to be understood also that an antenna length other than that approximating one-quarter wave can be used successfully, and that radiating systems different from the one illustrated in Fig. 1 will be found suitable for practicing the invention. For example, the "rhombic" antenna is aperiodic over a considerable frequency range, and would be found suitable in many instances. It is desired to emphasize, therefore, that the antenna described herein is not the only type of radiator that can be used successfully in practicing the invention, but it is the preferred form because of its simplicity, general utility and portability.

If a given current were to flow in a quarter-wave antenna of fixed height, the field intensity at the receiver loop 20 usually would increase as the frequency of the current increased unless some means were adopted to compensate for the change. There are several ways to accomplish the desired result, but the preferred means is to decrease the effective height of the antenna 5 as the frequency is increased. The intensity of the radiation emitted by an antenna operating under free-space conditions varies directly with the effective height of the said antenna, but with the preferred type of antenna described herein, which is placed comparatively close to the earth, the variation of intensity with effective height is not very large, and accordingly, it is found that the effective height of the inclined antenna illustrated in Fig. 1 can be varied automatically in substantially the correct amount for each frequency setting employed by properly proportioning the height of poles 8 and/or 9. Satisfactory operation has been obtained, when using moderate spreads and working over comparatively flat and open terrain, by making the height of pole 8 about 7 feet and pole 9 some 20 feet, though it is to be understood that the height of each pole can be varied to advantage at times.

For operations involving relatively long spreads, there is a tendency in some areas for the airwave field intensity at the receiver loop to decline with increasing frequency, due to terrain conditions and the effect of a larger attenuation term (which includes S) in the transmission equation. When working in areas characterized by abnormally high absorption, the decline in the receiver reading at the higher frequencies can be easily overcome by altering the height of poles 8 and/or 9. It has been found advantageous at times to use a quarter-wave inverted L antenna, whose flat top remains at the same height throughout the frequency measurements. Other alternatives, which give greater compensation at relatively distant points for the decrease in airwave field intensity with increasing frequency, are to raise the height of the L antenna as the frequency is raised, or to increase the radiation current by predetermined amounts as the frequency is increased.

It is well to state here that the behavior of the radiating system can be studied and checked by means of a control receiver located in the near neighborhood of the radiator, but far enough removed to lie well outside its induction field. By maintaining the required parameter or parameters constant at the said control receiver, it is possible to keep the radiation the same throughout the series of frequency measurements for any type of antenna system by altering its height and/or the current flowing therein. And alternatively, if the radiation were allowed to vary as the frequency of the emitted waves varied, whether progressively or anomalously, the change in the said radiation could be tolerated and compensated for by a comparison of the frequency-reading curve of the control receiver and that of the remote receiver employed in the regular field operations.

The preceding discussion has disclosed a preferred means and method for maintaining substantially constant field intensity for the air waves at the receiver loop 20, and it has been pointed out that alternative apparatus and operating techniques can be used successfully in practicing the herein invention. It should not be inferred from what has gone before that the invention is inoperative unless the said field intensity remains substantially constant, for experience demonstrates that workable results can be obtained without observing the precautions required to maintain the said field intensity essentially the same. It is known, however, that superior results are obtained with the preferred means and method described.

After the required frequency band has been explored, using the precautions mentioned to maintain substantially uniform field intensity for the air waves at the receiver loop 20, then a graph may be plotted which displays the relation between frequency and resultant field intensity at the said loop due to the combined air waves and ground waves. Quite obviously, the operation of the receiver 18 could be made automatic and its readings recorded on a photographic film, but the attendant complications appear unwarranted. When an underground reflector is present, such as the salt-water stratum 30 in Fig. 1, then the frequency-field intensity curve will display the interference phenomena which must take place at the said loop between the air waves and the ground waves which are returned to the surface by the underground reflector.

Reference will be made here to some practical examples to illustrate the interference phenomena under discussion, and to demonstrate the application of the present invention to the problem of determining the depth of a subsurface reflector. In Fig. 8 appears a frequency-field intensity curve obtained in the immediate vicinity of a well located in northwest Caddo Parish, Louisiana. A Schlumberger log of the well showed three water-filled strata: the Wilcox sand, exposed at the surface and extending to a depth of 675 feet; the Nacatoch sand, from 1,440 to 1,705 feet, and the Blossom sand lying at a depth of 2,450–2,525 feet. The best defined recurrent maxima and minima displayed by the curve represent "reflections" from the Nacatoch sand. In arriving at the incremental frequency corresponding to the Nacatoch reflections, the average frequency difference can be found from either the successive maxima or the successive minima, or by averaging the values shown by the said maxima and minima. Only the most prominent maxima correlating with the Nacatoch sand will be used in this instance, and in Fig. 8 is indicated the incremental frequency $(x)$ thus determined.

The frequency-field intensity curve shown in Fig. 9 was obtained in the same general area as that of Fig. 8, but where the depths of the same three strata were: Wilcox sand 0–385 feet; Nacatoch sand 1,176–1,415 feet, and Blossom sand 2,130–2,195 feet. Here again is indicated the incremental frequency $(x')$ that correlates with the most pronounced maxima identified with the ch reflections. It is noted that for Fig. 9 remental frequency is 0.185 mc., which is hat larger than the average value of 0.146 closed by the previous example. This is in onformity with the equations derived pre-, which show that the incremental fre- increases with decreasing depth of the regeologic sections investigated by the curves . 8 and 9 are analogous to the two-layer lustrated in Fig. 5, where the upper layer esented by the Wilcox sand, and the lower y a predominantly shale section which sep- the Wilcox and Nacatoch sands. It is from previous experience in the area discussion that the refractive index for the sand is 2.78 and for the shale section it is Substituting these values in Equations 5 espectively, and ignoring the inconsequen-  of the reflector, it is found that an incre- frequency of 0.146 mc. (Fig. 8) gives a for the Nacatoch sand of 1,448 feet, which the actual depth within 0.55 per cent, and a incremental frequency of 0.185 mc. (Fig. ults in a calculated depth of 1,179 feet, differs but 0.26 per cent from the actual read of 3,700 feet was used in obtaining the appearing in Figs. 8 and 9. In the same l area, however, excellent precision was ob- in checking the Nacatoch sand at a depth feet with a spread of 7,000 feet, thus con-  the fact that the spread does not enter y into the determination of reflector depths he herein invention.

letermine the depth of a subsurface reflec- m a frequency-field intensity curve, it is ary, of course, to know within reasonable the effective value of the refractive index the geologic section explored. If $n$ is not for the area under examination, and can estimated with sufficient accuracy, then it customary procedure in practicing this in- a to make a depth determination at a point general area being investigated where the and approximate dip of the required reflec- e known from drilling, and thereby solve in Equation 6 by substituting the known and dip of the reflector and the observed ental frequency. When the receiver is lo- along the "strike" of the reflector from the , it is evident that the dip reduces to zero, hen only the depth of the reflector and the ental frequency need be known in deter-  $n$. If more than one reflector is involved, eologic conditions will not permit the use average value of $n$ for the entire strati- c section overlying the reflector being in- ited, then Equation 8 can be used to deter- t for each overlying layer, the investigation commenced preferably with the uppermost and extended downward a layer at a time gressively increasing the spread between citer and receiver. With this technique no lty can be encountered from reflections  from reflectors deeper than the particular whose $n$ is required. It is to be understood, er, that oftentimes the reflections evi- l by a single frequency-field intensity curve ake possible the unambiguous determina- : the refractive indices corresponding to the tive layers separating a considerable num- reflectors. The procedure outlined here is the same as that followed in seismic pros- g, when velocity determinations are made at a well that furnishes the depths of significant reflectors, and the velocity values thus found are subsequently utilized in the same general area in making depth determinations involving the same or adjacent reflectors.

It should be recognized that interference maxima and minima will appear on a frequency-field intensity curve for each suitable reflecting surface whose depth does not exceed the maximum working depth fixed by the spread employed. For example, the curves of Figs. 8 and 9 display reflections from the base of the Wilcox sand and the top of the Blossom sand, in addition to the designated reflections from the top of the Nacatoch sand. It frequently occurs that both the top and base of the same zone can be identified from the curve, provided the thickness of the said zone is satisfactory and other conditions are satisfied. In all cases the reflectivity of a boundary separating two partially conducting media is governed, among other things, by the relative indices of refraction, it being remembered that for a partial conductor the index of refraction is determined to some extent by the angle of incidence of the waves on the said partial conductor, but principally by its conductivity, dielectric constant, magnetic permeability, and the frequency of the waves. Haas (loc. cit.) has developed an expression from Maxwell's equations for the complex refractive index of a partial conductor traversed by a plane wave. He shows that the imaginary part of the expression represents the absorption factor (Eq. 2), and the real part is given by:

$$n = \sqrt{\frac{\mu}{2}\left(\sqrt{\epsilon^2 + \frac{4\sigma^2}{\nu^2}} + \epsilon\right)}$$

where the notations are the same as for Equation 2. It can also be shown that the reflecting power of certain materials varies in an anomalous manner with frequency, and that at a discrete frequency band or bands the material exhibits exceptionally high reflectivity, in somewhat the same manner that various media show selective absorption characteristics. A complete discussion of reflection phenomena will be found in "High-Frequency Alternating Currents," "McIlwain and Brainerd, pp. 408–438, 1939, John Wiley & Sons, Inc., New York, and in "Electrodynamics," Page and Adams, pp. 408–419, 1940, D. Van Nostrand Co., Inc., New York.

In the practical use of the present invention to find the depth of underground reflectors, recourse often is had to curves similar to those appearing in Fig. 7, which show the relation between incremental frequency and depth for several values of the refractive index. It is advantageous at times to prepare a curve of this kind for each area under investigation, based on the value of $n$ which is estimated from experience or accurately determined, and the depth of a given reflector can be read from the curve by knowing the respective incremental frequency. The procedure may be applied to any reflector whose depth does not exceed the effective working depth, but in so doing it should be understood that it is particularly adapted to reconnaissance surveys not requiring much precision, for incremental frequency-depth curves ordinarily are based on the assumption that the dips of the reflectors are not large enough to alter appreciably the shape of the curves, and that the average refractive index of the material overlying the reflector being mapped remains essentially constant throughout the area surveyed.

In applying the herein described invention to determine the depth and structure of subsurface reflectors, an important advantage results from the fact that the maximum working depth can be easily controlled by the spread between the exciter and receiver, and hence an area can be mapped at progressively greater depths by correspondingly increased spreads. It is evident from this that any suitable reflector can be investigated without the sometimes confusing effect occasioned by deeper reflectors.

The results obtained in making depth determinations with the herein disclosed invention in a number of different geologic provinces demonstrate that the actual depths of various reflectors can be checked with an order of error not exceeding about one per cent, and that the invention has wide application and usefulness in mapping the structure of important subsurface formations in unknown areas.

Before ending the discussion dealing with the application of the invention to the problem of finding the depth of subsurface zones that reflect electromagnetic waves, it is desired to point out that the said invention furnishes an effective technique for determining the depth and configuration of the bedrock which ordinarily underlies placer deposits. The pronounced electrical contrast between the bedrock and overlying gravels offers an excellent reflector for electromagetic waves, and the depth and topography of the bedrock surface can be found quickly and conveniently with the comparatively short spreads usually required in practice. It is quite evident that the same procedure can be used in mapping the bedrock in other than placer areas, and in other than mining problems, for instance, in a considerable number of construction problems, where it is of great importance to know the depth and topography of the bedrock in order properly to design the foundations of dams, bridges and other structures.

Summarizing, the preceding discussion has pointed out certain inherent and fundamental fallacies identified with many of the earlier electromagnetic methods utilizing wave transmission; has dealt with the principle of operation of the present invention; has described apparatus and methods for propagating electromagnetic waves through partially conducting strata, and for detecting the waves on their return to the earth's surface after their reflection by underground masses having anomalous indices of refraction; the discussion has presented a useful and convenient method of finding the depth of buried reflectors, and has brought out notable advantages of the invention over previous techniques. It remains now to consider other important applications of the invention.

The next application to be discussed is that of locating and defining underground masses, other than geologic strata, which reflect electromagnetic waves. This category includes a number of significant applications, among which may be mentioned the problem of determining the presence, depth and extent of mineralized areas in mining geology. It is known that many minerals of economic importance are characterized by anomalous electrical properties which make their detection and definition by wave reflection a relatively simple matter. This is true for both lode and placer deposits. In the case of lode deposits, the metallic minerals as well as sulphide ores present sharp electrical contrasts with the country rock ordinarily encountered in practice, and for placer deposits, the presence of gold or other conducting minerals so increases the dielectric constant (and consequently the refractive index) of the enclosing earth volume that the mineralized area can be easily detected, defined and partially appraised by its increased reflecting power for electromagnetic waves. The presence of a mineralized area of the character mentioned is indicated by the appearance of maxima and minima on a frequency-field intensity curve obtained over the electrically anomalous area. By making a number of frequency runs at various locations in an area under examination, it is possible to determine the lateral extent and depth of the deposit at significant points. If the deposit were of sufficient thickness, its top and bottom limits could also be found.

A somewhat analogous problem is that of finding electrical discontinuities in buried strata, such as occur in a porous stratum at the boundary between salt water and petroleum, or when a reflecting zone "wedges out." From what has gone before it is quite obvious that a frequency-field intensity curve will evidence the "wedging out" of a reflecting zone by the disappearance of the characteristic maxima and minima associated with the said zone. And in a similar way the definite electrical contrast at the contact between buried accumulations of salt water and petroleum, whose conductivities and dielectric constants differ enormously, must necessarily cause significant indications on frequency-field intensity curves obtained above and adjacent to the said contact.

A fault represents a discontinuity in geologic strata, with the formations on one side of the fault vertically displaced with respect to the similar formations on the other side of the fault. It is quite clear that any vertical displacement of a reflecting zone will be apparent from depth determinations made on each side of the zone of faulting, and therefore frequency-field intensity curves obtained along a traverse which intersects the strike of a fault must disclose the difference in elevation of the reflectors at a fault plane. Moreover, the "throw" of the fault, at various depths, will be evident from the difference in elevation of the reflectors in the near vicinity of the zone of faulting.

Salt domes and igneous plugs, as well as numerous other discrete geologic masses, may be found and defined with this invention because of the difference in their reflection coefficients and those of the surrounding media. Upthrust masses that have been intruded through reflecting beds are detected with particular ease. The same is true for mineralized veins, many of which offer excellent reflecting surfaces for electromagnetic waves. The reflecting power of such a vein is determined largely by the degree of mineralization, and hence the invention makes it possible to secure an approximate idea of the amount of mineralization present in the vein.

We come now to a consideration of one of the most important applications of the invention, namely, the determination of the optimum frequency to be employed in conducting electromagnetic-wave investigations. The invention is well adapted to the solution of this problem, and the results derived therefrom furnish criteria for guiding the application of all electromagnetic methods utilizing wave propagation through absorbing media.

It has already been shown that the conventional belief is erroneous in supposing that the attenuation suffered by an electromagnetic wave in ing partially conducting media must in-
exponentially with the frequency of the
or the reason that the effective electrical
ies, which determine the attenuation loss,
1 an anomalous manner with frequency.
r words, geologic media exhibit selective-
cy absorption. The problem resolves it-
refore into providing means and methods
ling the particular frequency band, or one
able thereto, that makes the transparency
mum for the geologic section under inves-
1.

n the optimum frequency is to be found for
cular geologic section at a given location,
ferred method is to set up at the said lo-
the exciter 1 and receiver 18 with the
spread to explore to the required depth,
en obtain a frequency-field intensity curve.
in adequate range for the frequency meas-
its, it will be found that the maxima and
a associated with a particular subsurface
r will vary in amplitude as the frequency
smission is varied. Since the maximum
ide will occur when the frequency has its
m value, it follows that the optimum fre-
will lie at or between the conjugate max-
ind/or minimum having the largest ampli-
This is clearly displayed by the curve of
which shows that the recurrent maxima
inima near the middle of the frequency
explored have much greater amplitude
hose appearing at higher or lower fre-
es, and that for a depth of 1,440 feet the
ffective frequency for the range covered
bstantially between the maximum and
um denoted $t$ and $u$ respectively.

ough the curve of Fig. 8 shows that the
ffective frequency for the range investi-
falls substantially within the interval $tu$,
ibits the further fact that the optimum
ncy probably would be lower than any used
series of measurements, since the curve
ues to rise as the frequency decreases, and
ld therefore be expected that maxima and
a would be found at a lower frequency or
ncies whose amplitudes would exceed those
maximum and minimum respectively de-
$t$ and $u$. It is evident, of course, that to
ine the optimum frequency in a given
is necessary to find the maximum and/or
um having the largest amplitude that can
ained by exploring the entire usable por-
f the electric spectrum. Experience dem-
tes, however, that it is unnecessary in prac-
tually to determine the single frequency,
row frequency band, that passes the great-
iount of energy through the section. To
ve time in the field operation of the inven-
nd to simplify the design and construction
exciter and receiver, only a sufficient range
lored to disclose a frequency band that will
nough energy to satisfy the requirements of
oblem at hand. Once the frequency char-
stics of various geologic provinces are cata-
l, the optimum frequency band, or one of
trable effectiveness, can be found by investi-
; a relatively small frequency range. Satis-
y results have been obtained in practice by
ing a frequency range whose lower limit
ot extend below 100 kc. and whose upper
lid not exceed 5 mc.

way of emphasis it may be well to restate
hat the occurrence of maxima and minima
requency-field intensity curve evidences the
ice of a subterranean reflector; the fre-
quency increment between successive maxima or
minima is a measure of the depth of the reflector,
and the frequency at which the maxima or mini-
ma have maximum amplitude defines the "opti-
um frequency."

The converse problem of determining for a par-
ticular stratigraphic section the frequency band
at which the absorption of energy is greatest, or
the bands at which absorption increases, is solved
by finding the frequency or frequencies which
reduce the amplitude of the maxima and minima
associated with a reflector lying near the required
depth of investigation.

In using frequency-field intensity curves for
the purpose of determining the frequency char-
acteristics of the media involved, it is to be re-
membered that large amplitude variations are
due at times to the synchronized influence of two
or more reflectors, and hence in finding the op-
timum frequency or absorption bands by means
of the relative amplitudes of successive maxima
and/or minima, the said amplitudes must be re-
lated only to a discrete reflector, and not to the
combined effect of two or more reflectors. Also,
selective reflection as well as selective absorption
must be considered. This is a fortunate circum-
stance, for selective reflection phenomena some-
times will provide a means for identifying cer-
tain strata and minerals whose reflectivities so
vary with frequency that their presence is dis-
closed by wave reflection.

It will be evident from what has gone before
that low attenuation of the waves, and/or high
reflectivity of the surface bounding a buried mass
characterized by selective reflection, can lead to
the relatively large amplitudes of the maximum
and/or minimum that is used in finding the opti-
mum frequency. This composition of effects in-
troduces no difficulty, however, for regardless of
the cause, the frequency so found is the optimum
frequency to employ in mapping the said surface.
The attenuation and selective-reflection effects
can be separated by a comparison of optimum-
frequency determinations carried out with reflec-
tors above and/or below the said surface. Obvi-
ously, the same procedure can be used in the an-
alysis of absorption bands disclosed by frequency-
field intensity curves. In making such compari-
sons it is to be remembered that the attenuation
of the waves normally increases as the length of
the underground wave path increases; that the
amplitude of the periodically recurrent maxima
and minima decreases as the attenuation in-
creases; that the optimum-frequency amplitude
of the maxima and minima should normally de-
crease as the depth of the reflector increases, and
that any sharp discontinuity in the optimum-fre-
quency amplitude versus depth relation signifies
the presence of a reflector having selective-re-
flection characteristics.

For the sake of simplicity, the foregoing dis-
cussion has concerned only the preferred forms
of apparatus, and the preferred modes of opera-
tion, whereby the measurements involve only the
component of the electric field lying in the verti-
cal plane that includes the receiver loop 20 and
exciter antenna 5 present at the receiver loop 20.
It is to be emphasized, however, that alternative
apparatus may be employed, and that alterna-
tive methods of operation are possible, and that
these alternative methods may, by utilizing the
universal mounting provided for the said loop, be
predicated on the variations with frequency of
any significant parameter or parameters of the
electromagnetic field.

It is to be understood that the apparatus and methods disclosed herein are susceptible of various modifications without departing from the spirit or broad principles of the invention, and accordingly it is desired to claim all novelty inherent in the invention as broadly as the prior art permits.

What is claimed as new and useful is:

1. In the art of investigating earth formations including a reflector of electromagnetic waves lying beneath the surface of the earth, the step of simultaneously propagating from a sending point electromagnetic waves through the air to a receiving point and through the earth to said reflector and thence to said receiving point, the step of measuring at said receiving point a parameter of electromagnetic field resulting from the combined waves arriving at said receiving point, the step of varying the frequency of said waves through a frequency range sufficient to produce successive maxima or minima in the values of said parameter, and the step of determining the corresponding successive values of said parameter and the frequency at which said parameter is measured, wherein the occurrence of said successive maxima or minima in the values of said parameter is indicative of the presence of said reflector.

2. The method as set forth in claim 1, wherein the step of determining the corresponding successive values of said parameter and the frequency at which said parameter is measured constitutes a recording of said corresponding successive values of said parameter and the frequency at which said parameter is measured.

3. The method as set forth in claim 2, including the step of determining the incremental frequency between said successive maxima or minima, wherein said incremental frequency is a measure of the depth of said reflector.

4. The method as set forth in claim 1, wherein the step of determining the corresponding successive values of said parameter and the frequency at which said parameter is measured constitutes a recording of said corresponding successive values of said parameter and the frequency at which said parameter is measured, and wherein the frequency range explored is extended sufficiently to disclose frequencies that produce an increase and a decrease in the amplitude of said successive maxima or minima, whereby a maximum in said amplitude signifies a transmission band for the earth media overlying said reflector and a minimum in said amplitude signifies an absorption band for said media.

5. The method set forth in claim 1, wherein the simultaneous propagation of said waves from said sending point is carried out by propagating from said sending point electromagnetic waves through the air and along the earth's surface to said receiving point in a manner adapted to simultaneously and progressively refract some of said waves into the earth and downward along multiple substantially parallel paths onto said reflector and thence to said receiving point.

6. The method as set forth in claim 5, including the step of repeating the operations described for different separations between said sending point and said receiving point, wherein increasing said separation increases the depth of investigation and decreasing said separation decreases the depth of investigation.

7. The method as set forth in claim 1, wherein the simultaneous propagation of said waves from said sending point is carried out by propagating from said sending point electromagnetic waves through the air along the earth's surface to said receiving point in a manner adapted to simultaneously and progressively refract some of said waves into the earth and downward along multiple substantially parallel paths onto said reflector and thence to said receiving point, wherein the refracted waves arriving at said receiving point are caused to strike said reflector at a location where the approximate depth and dip of said reflector are known, wherein the step of determining the corresponding successive values of said parameter and the frequency at which said parameter is measured constitutes a recording of said corresponding successive values of said parameter and the frequency at which said parameter is measured, and including the step of determining the incremental frequency between said successive maxima or minima, and the step of determining the effective refractive index of the earth media overlying said reflector from said incremental frequency and from the known depth and dip of said reflector.

8. The method as set forth in claim 1, wherein the simultaneous propagation of said waves from said sending point is carried out by propagating from said sending point electromagnetic waves through the air along the earth's surface to said receiving point in a manner adapted to simultaneously and progressively refract some of said waves into the earth and downward along multiple substantially parallel paths onto said reflector and thence to said receiving point, wherein the effective refractive index of the earth media overlying said reflector and traversed by the refracted waves arriving at said receiving point is known, wherein the refracted waves arriving at said receiving point are caused to strike said reflector at a location where the approximate dip of said reflector is known, wherein the step of determining the corresponding successive values of said parameter and the frequency at which said parameter is measured constitutes a recording of said corresponding successive values of said parameter and the frequency at which said parameter is measured, and including the step of determining the incremental frequency between said successive maxima or minima, and the step of determining the depth of said reflector from said incremental frequency and from the known dip of said reflector and the known refractive index of the earth media overlying said reflector.

WILLIAM M. BARRET.

REFERENCES CITED

The following references are of record in the file of this patent:

UNITED STATES PATENTS

| Number | Name | Date |
|---|---|---|
| 1,718,352 | Guilford | June 25, 1929 |
| 1,838,371 | Deardorff | Dec. 29, 1931 |
| 1,843,407 | Sundberg | Feb. 2, 1932 |
| 2,077,707 | Melton | Apr. 20, 1937 |
| 1,845,379 | West | Feb. 16, 1932 |
| 2,139,460 | Potapenko | Dec. 6, 1938 |
| 2,172,688 | Barrett | Sept. 12, 1939 |
| 1,881,483 | Gillett | Oct. 11, 1932 |
| 2,079,205 | Gillett | May 4, 1937 |
| 2,153,051 | Pierce | Apr. 4, 1939 |

(over)

Certificate of Correction

Patent No. 2,426,918.   September 2, 1947.

WILLIAM M. BARRET

It is hereby certified that errors appear in the printed specification of the above numbered patent requiring correction as follows: Column 6, line 31, for "C," read $\lambda$; column 8, lines 23, 26, 28, and 32, for the reference letter "s" read $v$; column 10, line 32, for "angie" read *angle*; column 11, line 8, for "suffiicent" read *sufficient*; column 16, lines 46 and 47, before the name "McIlwain" strike out the quotation mark; and that the said Letters Patent should be read with these corrections therein that the same may conform to the record of the case in the Patent Office.

Signed and sealed this 2d day of December, A. D. 1947.

[SEAL]

THOMAS F. MURPHY,
*Assistant Commissioner of Patents.*

---

Certificate of Correction

Patent No. 2,426,918.   September 2, 1947.

WILLIAM M. BARRET

It is hereby certified that error appears in the printed specification of the above numbered patent requiring correction as follows: Column 9, line 14, for the equation number "(5)" read *(3)*; and that the said Letters Patent should be read with this correction therein that the same may conform to the record of the case in the Patent Office.

Signed and sealed this 25th day of May, A. D. 1948.

[SEAL]

THOMAS F. MURPHY,
*Assistant Commissioner of Patents.*